(12) United States Patent
Salessi et al.

(10) Patent No.: US 7,765,339 B2
(45) Date of Patent: Jul. 27, 2010

(54) DISTRIBUTED ADDRESSING IN SOLID-STATE STORAGE

(75) Inventors: Nader Salessi, Laguna Niguel, CA (US); Hooshmand Torabi, Irvine, CA (US)

(73) Assignee: STEC, Inc., Santa Ana, CA (US)

( * ) Notice: Subject to any disclaimer, the term of this patent is extended or adjusted under 35 U.S.C. 154(b) by 27 days.

(21) Appl. No.: 11/978,176

(22) Filed: Oct. 26, 2007

(65) Prior Publication Data

US 2008/0140945 A1    Jun. 12, 2008

Related U.S. Application Data

(60) Provisional application No. 60/854,940, filed on Oct. 27, 2006.

(51) Int. Cl.
*G06F 13/00* (2006.01)

(52) U.S. Cl. .............................. 710/33; 710/30; 710/36; 711/148

(58) Field of Classification Search ....................... None
See application file for complete search history.

(56) References Cited

U.S. PATENT DOCUMENTS

| 5,333,143 | A | 7/1994 | Blaum et al. | |
| 7,284,089 | B2 * | 10/2007 | Gallivan et al. | 711/115 |
| 2005/0223269 | A1 * | 10/2005 | Stolowitz | 714/6 |

* cited by examiner

*Primary Examiner*—Alan Chen
(74) *Attorney, Agent, or Firm*—McDermott Will & Emery LLP

(57) ABSTRACT

A data storage system includes a data management system that transfers data between a host system and multiple storage devices through multiple channels. The data addressing is distributed amongst channels to improve system performance and durability. In one embodiment, each channel has an address translation table or address map which is utilized to gain performance improvement during data transfer or erasure, and an increase of the device's useful life span.

20 Claims, 13 Drawing Sheets

315

| 400<br>Logical Block Address 0 | 405<br>Physical Block Address A |
|---|---|
| 400<br>Logical Block Address 1 | 405<br>Physical Block Address B |
| 400<br>Logical Block Address 2 | 405<br>Physical Block Address C |
| 400<br>Logical Block Address 3 | 405<br>Physical Block Address D |
| ⋮ | ⋮ |

FIG. 4

DISTRIBUTED ADDRESSING IN SOLID-STATE STORAGE

CROSS-REFERENCE TO RELATED APPLICATIONS

This application claims benefit of U.S. Provisional Patent Application No. 60/854,940 filed Oct. 27, 2006, and entitled "Parallel Data Transfer and Structure," which is incorporated herein by reference, and further, the present invention is related to co-pending U.S. patent application Ser. No. 11/978, 215 entitled "Multi-Channel Solid-State Storage System" and filed on even date herewith, and co-pending U.S. patent application Ser. No. 11/978,177 entitled "Parallel Data Transfer in Solid-State Storage" and filed on even date herewith, each of which is incorporated herein by reference in its entirety.

BACKGROUND

1. Field of Invention

The present invention generally relates to data storage systems, and more particularly to data storage systems using one or more or solid-state storage devices.

2. Description of Related Art

The demand for solid-state data storage capacity, including Flash data storage capacity, is continually increasing. While the capacities available from storage devices are also increasing, many applications have data storage requirements that exceed the capacity available from a single storage device. One storage solution for these applications is a data storage system using more than one, or an array of, storage devices.

Storage device arrays increase storage capacity by providing more storage locations to store data from a host system or host device. However, a host system typically transfers data to and from the data storage system at a faster rate than individual storage devices can read or write the data. Thus, while storage capacity may be increased by adding storage devices, the data transfer performance of the data storage system may not be improved, and thus, as a whole is typically limited to the level of performance of the individual storage devices.

In light of the above, a need exists for improving the performance and the data transfer rate of a data storage system.

SUMMARY

In various embodiments, a data storage system includes a data management system that transfers data between a host system and multiple storage devices. The transferred data includes data segments, each of which includes one or more data sectors. The data management system transfers the data segments to the storage devices in parallel through data channels. Additionally, the data management system updates a selected data sector contained in a storage device by performing an erasure operation on the selected data sector and writing an updated data sector into that storage device. In this way, the erasure operation is performed only in the storage device containing the selected data sector, which reduces the number of erasure operations in the storage devices that would otherwise occur if the data sectors of each data segment were distributed among the storage devices.

The present invention improves the performance of conventional data storage systems by transferring data segments in parallel between the host system and the storage devices and by reducing the number of erasure operations performed to update data sectors in those data segments. The improvement in parallelism allows the array of storage devices to collectively attain a data transfer rate greater than that available from any of the storage devices individually. Further, the improvement in updating the data sectors reduces the number of erasure operations performed on the storage devices, which increases the lifetimes of the storage devices and the data storage system.

A method for storing data, in accordance with one embodiment, includes receiving a plurality of data segments. Each data segment of the plurality of data segments includes at least one data sector. The method also includes storing the data segments in a buffer and distributing the data segments among a plurality of storage devices. The data segments are distributed among the plurality of storage devices such that the data segments are transferred to the plurality of storage devices substantially in parallel but the data sectors of each data segment are sequentially transferred to the storage devices.

A method for storing data, in accordance with one embodiment, includes receiving a plurality of the data segments from a plurality of storage devices. Each data segment includes at least one data sector. The data segments are received substantially in parallel but the data sectors of each data segment are sequentially received from the storage devices. The method also includes storing the data segments into a buffer.

A data storage system, in accordance with one embodiment, includes a plurality of storage devices, a plurality of communication channels corresponding to the plurality of storage devices, and a data management system coupled to the storage devices through the corresponding data channels. The data management system is configured to receive a plurality of data segments, each which at least one data sector. The data management system is further configured to distribute the data segments among the storage devices. The data management system distributes the data segments among the storage devices such that the data segments are transferred to the storage devices substantially in parallel but the data sectors of each data segment are sequentially transferred to the storage devices.

A data storage system, in accordance with one embodiment, includes a plurality of storage devices and a data management system coupled to the storage devices. The data management system is configured to receive a plurality of the data segments from the storage devices. Each data segment includes at least one data sector. The data management system receives the data segments in parallel from the storage devices but receives the data sectors of each data segment sequentially from the storage devices.

A method for storing data, in accordance with one embodiment, includes receiving a plurality of data segments. Each data segment of the plurality of data segments includes at least one data sector. The method further includes storing the plurality of data segments in a buffer and generating an address map for mapping each data segment of the plurality of data segments to a respective storage device of a plurality of storage devices. Additionally, the method includes distributing the data segments among the plurality of storage devices based on the address map, such that the data sectors of each data segment of the plurality of data sectors are sequentially transferred to the plurality of storage devices, and the data segments of the plurality of data segments are transferred to the plurality of storage devices substantially in parallel.

A data storage system, in accordance with one embodiment, includes a plurality of storage devices, a plurality of communication channels corresponding to the plurality of storage devices, and a data management system coupled to the plurality of storage devices through the corresponding data channels. The data management system is configured to receive a plurality of data segments. Each data segment of the plurality of data segments includes at least one data sector. The data management system is further configured to generate an address map for mapping each data segment of the plurality of data segments to a respective storage device of the plurality of storage devices. Additionally, the data management system is further configured to distribute the data segments of the plurality of data segments among the plurality of storage devices based on the address map, such that the data sectors of each data segment of the plurality of data segments are sequentially transferred to a storage device of the plurality of storage device associated with the data segment, and the plurality of data segments are transferred to the plurality of storage devices substantially in parallel.

The foregoing summary of embodiments of the present invention has been provided so that the nature of the present invention can be quickly understood. A more detailed and complete understanding of embodiments of the present invention can be obtained by reference to the following detailed description of the present invention together with the associated drawings.

BRIEF DESCRIPTION OF THE DRAWINGS

The accompanying drawings are included to provide a further understanding of the present invention, and are incorporated in and constitute a part of this specification. The drawings illustrate embodiments of the present invention, and together with the description, serve to explain the principles of the present invention. In the drawings.

FIG. 4 is a block diagram of an address map, or an address translation table, in accordance with an embodiment of the present invention;

DETAILED DESCRIPTION

In various embodiments, a data storage system includes a data management system and storage devices. The data management system communicates, and transfers data to and from, the storage devices through communication channels. The storage devices are coupled to the data management system through the channel corresponding to the storage device. In some embodiments, more than one storage devices may transfer data through one channel, while in other embodiments, there is a one-to-one correspondence between the number of channels and storage devices.

The data management system receives data sequentially from a host system and transfers the data, as data segments, to the channels in parallel. Thus, the storage devices receive the data segments in a parallel manner. Additionally, the data management system receives data segments from the storage devices and channels in parallel. The data management system may reassemble the data segments into data for transfer to the host system, and sequentially transfers the data to the host system.

Figure 1:
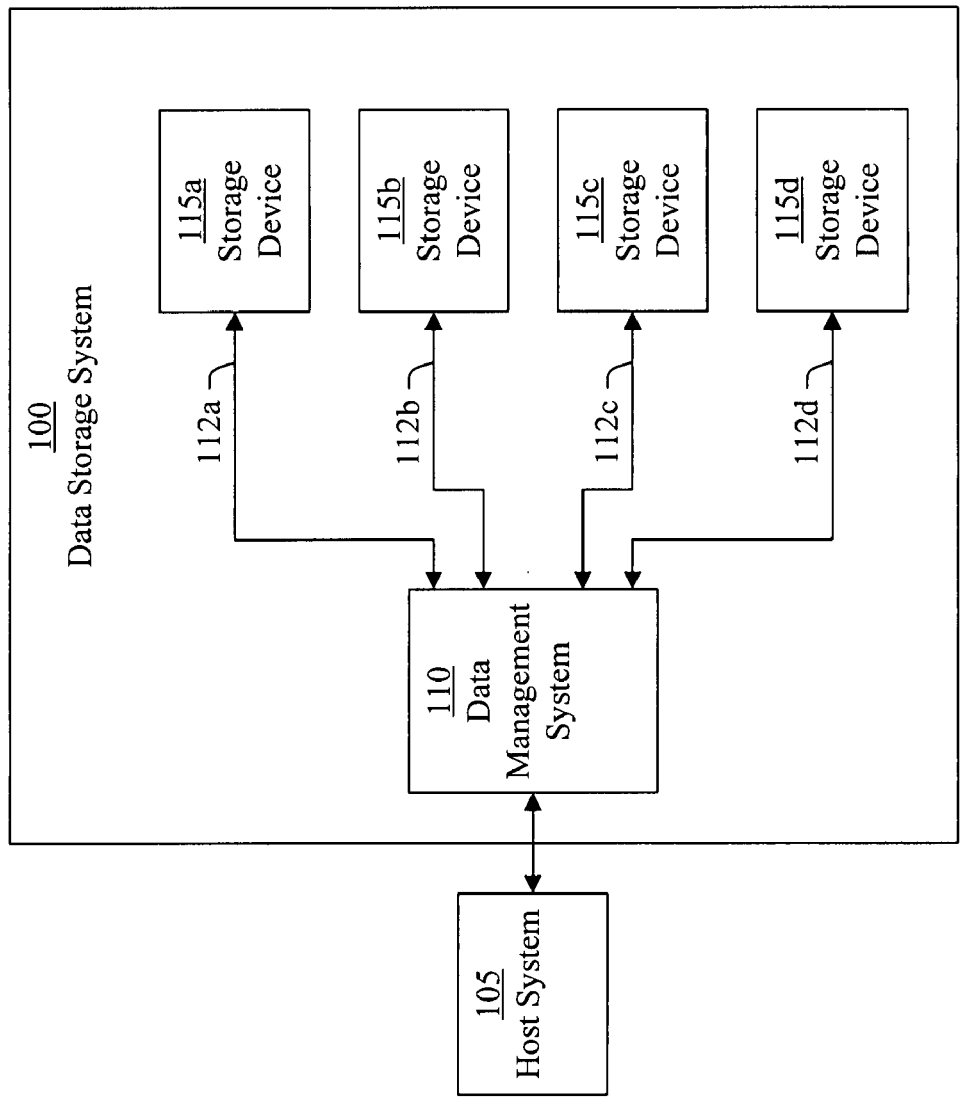
FIG. 1 is a block diagram of a data storage system coupled to a host system, in accordance with an embodiment of the present invention.

FIG. 1 illustrates a data storage system 100, in accordance with an embodiment of the present invention. The data storage system 100 includes a data management system 110 and storage devices 115 (e.g., storage devices 115a, 115b, 115c, and 115d). The data management system 110 is coupled to the storage devices 115 through corresponding data channels 112 (e.g., data channels 112a, 112b, 112c, and 112d). The data channels 112 may be referred to as channels or communication channels. The data channels 112 may be any system, device, connection, or interface system for facilitating communications between the data management system 110 and the storage devices 115. For example, each of the communication channels 112 may a communication bus. Additionally, the data management system 110 is coupled to a host system 105. As is described in more detail below, the data management system 110 stores data received from the host system 105 in the storage devices 115. Additionally, the data management system 110 retrieves data stored in the storage devices 115 at the request of the host system 105 and transfers the requested data to the host system 105.

In one embodiment, the data storage system 100 includes four storage devices 115a-d coupled to the data management system 110 through four corresponding data channels 112a-d. It is to be understood, however, that the present invention is not limited to four storage devices 115 or four data channels 112 and may be implemented with more or less than four storage devices 115 and more or less than four data channels 112. For example, the data storage system 100 may include four, eight, sixteen, thirty-two, or any other number of storage devices 115 and data channels 112. In some embodiments, there may be a one-to-one correspondence between the data channels 112 and storage devices 115, and yet in other embodiments, there may not be a one-to-one correspondence. For example, in some embodiments, more than one storage device 115 may be coupled, and transferred data through, one data channel 112. Although FIG. 1 illustrates the data management system 110 and the storage devices 115a-d as separate components in the data storage system 100, the data management system 110 and the storage devices 115a-d may be assembled and packaged as a single component or as separate components which are later connected together by an end user or manufacturer of the data storage system 100. For example, the data management system 110 and the storage devices 115 may all be manufactured on an integrated circuit.

In various embodiments, each of the storage devices 115 includes a storage medium for storing data. In operation, the storage devices 115 write data to the storage mediums and read data from the storage mediums. The storage medium of a storage device 115 may be any type of data storage, such as a flash storage system, a solid-state drive, a flash memory card, a secure digital (SD) card, a universal serial bus (USB) memory device, a CompactFlash card, a SmartMedia device, a flash storage array, or the like. One skilled in the art will recognize that other types of storage devices such as hard drives and optical media drives may also be used without departing from the scope of the present invention. The storage devices 115 may be the same type of device or may be different types of devices. The storage devices 115 may have the same storage capacity or the storage devices 115 may have differing storage capacities.

The host system 105 may be any system or device having a need for data storage or retrieval and a compatible interface for communicating with the data storage system 100. For example, the host system 105 may a computing device, a personal computer, a portable computer, or workstation, a server, a personal digital assistant, a digital camera, a digital phone, or the like. The host system 105 may communicate with the data storage system 100 by using a communication interface, such as an Integrated Drive Electronics (IDE) interface, a Universal Serial Bus (USB) interface, a Serial Peripheral (SP) interface, an Advanced Technology Attachment (ATA) interface, a Serial Advanced Technology Attachment (SATA), a flash interface, a Small Computer System Interface (SCSI), an IEEE 1394 (Firewire) interface, or the like. In some embodiments, the host system 105 includes the data storage system 100. In other embodiments, the data storage system 100 is remote with respect to the host system 105 or is contained in a remote computing system coupled in communication with the host system 105. For example, the host system 105 may communicate with the data storage system 100 via a wireless communication link.

Figure 2:
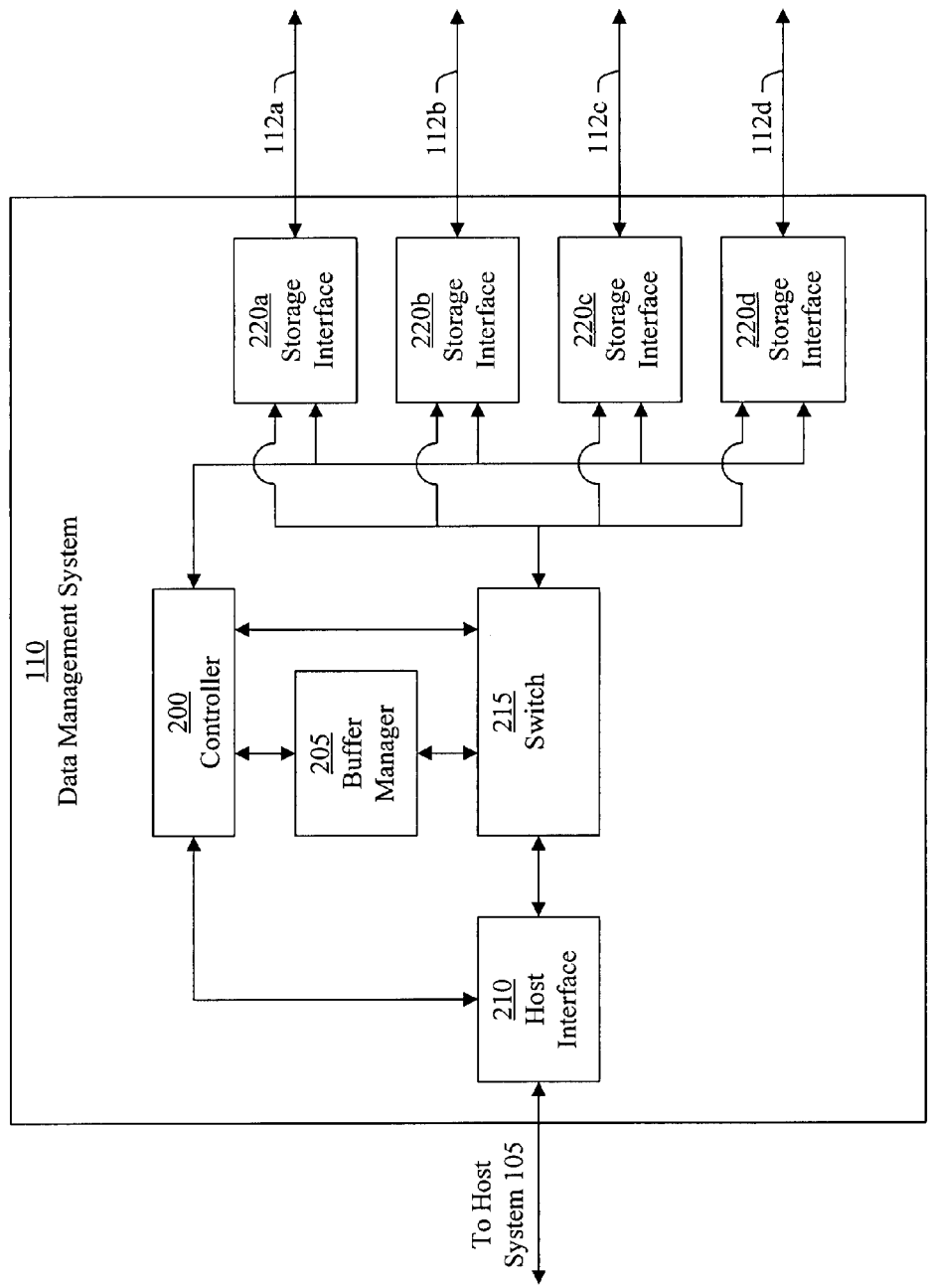
FIG. 2 is a block diagram of a data management system, in accordance with an embodiment of the present invention.

FIG. 2 illustrates components of the data management system 110, in accordance with an embodiment of the present invention. The data management system 110 includes a controller 200, a buffer manager 205, a host interface 210, a switch 215, and storage interfaces 220 (e.g., storage interfaces 220a, 220b, 220c, and 220d). The host interface 210 is coupled to the host system 105, the controller 200, and the switch 215. The storage interfaces 220 are coupled to the controller 200 and the switch 215. The storage interfaces 220 are also coupled to respective storage devices 115. In this way, each storage interface 220 is associated with one of the storage devices 115. In some embodiments, the storage interfaces 220 include buffers for synchronizing a data transfer rate of the switch 215 with a data transfer rate of the storage devices 115. For example, each of the storage interfaces 220 may include a ping-pong buffer for synchronizing the data rate of the switch 215 with the data rate of the storage device 115 coupled to the storage interface 220. The buffer manager 205 is coupled to the controller 200 and the switch 215. Additionally, the controller 200 is coupled to the switch 215.

The host interface 210 facilitates communication between the host system 105 and the data management system 110.

The storage interfaces 220 facilitate communication between the data management system 110 and the storage devices 115. The switch 215 functions to selectively connect the host interface 210 and storage interfaces 220 to the buffer manager 205, thereby allowing the host interface 210 and the storage interfaces 220 to transfer data to and from the buffer manager 205. The controller 200 monitors and controls operation of the data management system 110 and components contained therein.

As mentioned above, the host interface 210 facilitates communication between the host system 105 and the data management system 110. This communication includes the transfer of data as well as command and control information. In some embodiments, the host interface 210 is optional in the data management system 110. For example, the host system 105 may include the host interface 210 or the host interface 210 may be between the host system 105 and the data management system 110. In other embodiments, the host interface 210 is partially external of the data management system 110. In one embodiment, the host interface 210 is an Advanced Technology Attachment (ATA) interface which functions as an ATA target device that receives and responds to commands from an ATA host operating in the host system 105. In other embodiments, the host interface 210 may include another type of interface, which may use a variable or fixed data packet size. For example, the host interface 210 may include a Small Computer System Interface (SCSI), which uses a fixed data packet size. The host interface 210 may include a physical interface, such as CompactFlash or other ATA compatible interfaces. In some embodiments, a bridge or other conversion device may be used to interconnect the host interface 210 and the host system 105 through other types of ports or interfaces, such as a Universal Serial Bus (USB) port, a Serial Advanced Technology Attachment (SATA), a flash interface, or an IEEE 1394 (Firewire) port.

The storage interfaces 220 facilitate communication between the data management system 110 and the storage devices 115. This communication includes the transfer of data as well as command and control information in some embodiments. In one embodiment, the storage interfaces 220 are ATA interfaces implemented as ATA host devices and the storage devices 115 are implemented as ATA target devices. In this embodiment, the storage interfaces 220 generate commands which are executed by the storage devices 115. The storage interfaces 220 are not limited to any one ATA interface standard and may use other types of interfaces, which may use a fixed or variable data packet size. For example, the storage interfaces 220 may include a SCSI interface, which uses a fixed data packet size. The storage interfaces 220 may include a physical interface such as a CompactFlash interface or other ATA compatible interfaces. Additionally, a bridge or other conversion device may be used to interconnect the storage interfaces 220 and the storage devices 115 through other types of ports, such as a USB port or an IEEE 1394 port. In some embodiments, the storage interfaces 220 may use a different type of interface than that used by host interface 210. In some embodiments, the storage interfaces 220 may include a combination of interfaces. For example, some of the storage interfaces 220 may be CompactFlash interfaces and some of the storage interfaces 220 may be SCSI interfaces. The storage interfaces 220 may also use other interfaces such as SATA, a flash interface, or the like In one embodiment, the switch 215 is a multiple port bus. In this embodiment, the host interface 210, each of the storage interfaces 220, and the buffer manager 205 are coupled to a respective port of the multiple port bus. The controller 200 controls the operation of the switch 215 to selectively connect the host interface 210 and the storage interfaces 220 to the buffer manager 205. Additional details on the connections between the host interface 210, the storage interfaces 220, and the buffer manager 205 according to one embodiment are provided below. Not all embodiments will have all the components or connections depicted in FIG. 2, and some embodiments may have additional components or connections not depicted in FIG. 2.

Figure 3:
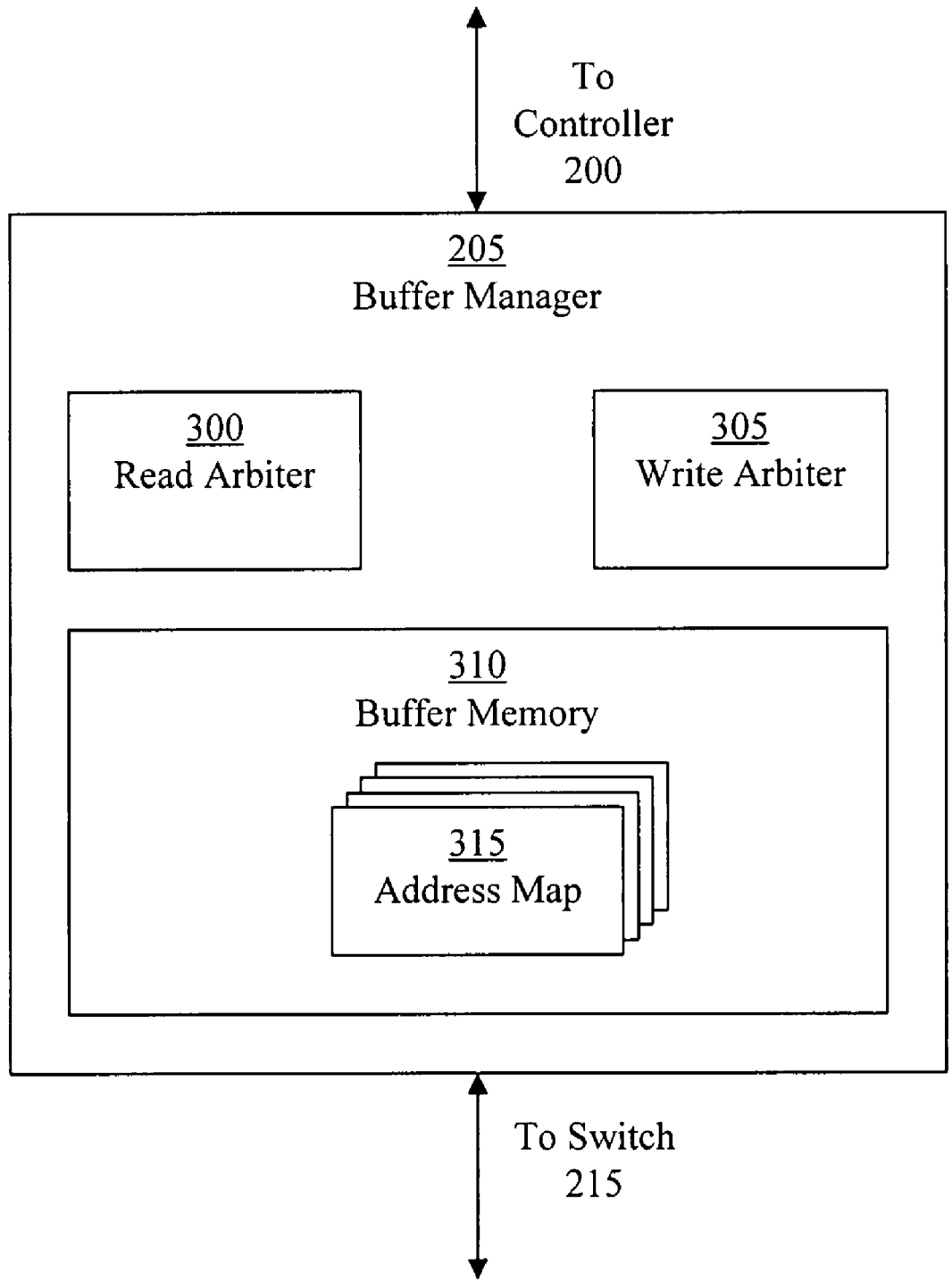
FIG. 3 is a block diagram of a buffer manager, in accordance with an embodiment of the present invention.

FIG. 3 illustrates the buffer manager 205, in accordance with an embodiment of the present invention. The buffer manager 205 includes a read arbiter 300, a write arbiter 305, and a buffer memory 310 (e.g. a buffer). The buffer memory 310 is used to store data being transferred between the host system 105 and the storage devices 115. The buffer memory 310 may include any type of buffer, register, memory, or storage, such as a random access memory (RAM), a dynamic random access memory (DRAM), a static random access memory (SRAM), a synchronous dynamic random access memory (SDRAM), a flash storage, an erasable programmable read-only-memory (EPROM), an electrically erasable programmable read-only-memory (EEPROM), or the like. The buffer memory 310 may be a single port memory or a dual port memory or the like.

The buffer memory 310 preferably includes sufficient storage capacity to store a maximum amount of data to be transferred between the host system 105 and the storage devices 115 during a single read or write operation. For example, under an ATA standard, 256 sectors of 512 bytes each is the maximum amount of data read or written in response to a single ATA command. In this example, buffer memory 310 has sufficient capacity to store at least 256 sectors of data (e.g., 256 data sectors).

The read arbiter 300 and the write arbiter 305 handle requests for operations on the buffer memory 310. Specifically, the read arbiter 300 manages requests for read operations for transferring data from the buffer memory 310, and the write arbiter 305 manages requests for write operations for transferring data to the buffer memory 310. In one embodiment, each of the read arbiter 300 and the write arbiter 305 is implemented using digital logic and is capable of managing three simultaneous requests received from any of the controller 200, the host interface 210, or the storage interfaces 220. The read arbiter 300 and the write arbiter 305 may handle more or fewer than three simultaneous requests in other embodiments.

Priorities for granting access to buffer memory 310 may be varied depending on the design requirements of the data storage system 100. For example, requests from the controller 200 may be given top priority followed by requests from the host interface 210 and the storage interfaces 220. One skilled in the art will recognize that arbiters having different configurations and capacities may be used in various embodiments of the present invention.

The controller 200 may include a microprocessor, a microcontroller, an embedded controller, a logic circuit, software, firmware, or any kind of processing device. In one embodiment, the controller 200 is a microcontroller including a processor and a memory, which is programmed to execute code for performing the operations of the data storage system 100. In other embodiments, controller 200 may include a microprocessor and a finite state machine, or may include a call processor. Although only a single controller 200 is illustrated in FIG. 2, it is to be understood that the data management system 110 may include more than one controller 200 with various control tasks being distributed between the controllers 200. The operation of the controller 200 will be described further below.

Some or all of the components of the data management system 110 described above may be implemented using individually packaged application specific integrated circuits (ASICs) or programmable gate arrays. For example, the host interface 210, the storage interfaces 220, the switch 215, and the buffer manager 205 may be implemented using a single ASIC or a single field programmable gate array (FPGA).

The data storage system 100 further includes address maps 315 corresponding to the data channels 112 and storage devices 115 for mapping addresses of the host system 105 to addresses of the storage devices 115. The address maps 315 may also be referred to as address translation table, logical-to-physical table, virtual-to-physical table, directory, or the like. The address maps 315 may be any type of data structure, such as a table. For example, an address map 315 may be a logical-to-physical address table, a virtual-to-physical address table, a translation table, a directory, a formula, or the like. In one embodiment, each of the address maps 315 maps logical block addresses (LBAs) of the host system 105 to physical block addresses (PBAs) of the storage device 115 corresponding to the address map 315. In various embodiments, an LBA of the host system 105 identifies data to be transferred between the host system 105 and one or more of the storage devices 115. A data segment is a portion of data which may comprise a data sector, two or more data sectors, or a portion of a data sector, depending on the embodiment or implementation. The address map 315 maps each data segment identified by the LBA to a PBA of one of the storage devices 115.

In some embodiments, the address map 315 maps the data identified by an LBA of the host system 105 to respective PBAs across the storage devices 115 such that the data is striped across the storage devices 115. In these embodiments, each of the address maps 315 maps a data block identified by an LBA of the host system 105 to a respective PBA in the storage device 115 corresponding to the address map. In this way, the each data sector in a data segment is mapped to the same storage device 115. An advantage of mapping the data sectors of a data segment to the same storage device 115 is that an erasure operation need only be performed on that storage device 115 when a data sector in the data segment is updated in a write operation. Consequently, the number of overall erasure operations performed on the storage devices 115 is reduced, which increases the lifetimes of the storage devices 115 and the data storage system 100.

In one embodiment, data segments are mapped to corresponding data channels 112 and storage devices 115 based on least significant bits of the LBAs of the data segments. For example, a data segment may be mapped to a data channel 112 computing a value equal to the LBA modulo the number of data channels 112 in the data storage system 100. In one embodiment, the data storage system 100 includes four data channels 112. In this embodiment, LBAs having two least significant bits equal to 'b00 are mapped to a first data channel 112 (e.g., data channel 112a), LBAs having two least significant bits equal to 'b01 are mapped to a second data channel 112 (e.g., data channel 112b), LBAs having two least significant bits equal to 'b10 are mapped to a third data channel 112 (e.g., data channel 112c), and LBAs having two least significant bits equal to 'b11 are mapped to a fourth data channel 112 (e.g., data channel 112d). Moreover, the data storage system 100 transfers data segments between the data management system 110 and the storage devices 115 through the data channels 112 corresponding to the LBAs of the data segments. In other embodiments, the data storage system 100 may have more or fewer than four data channels 112, such as 2, 8, 16, 32, or any other number of channels which may not necessarily be a power of 2 in the particular embodiment.

Although FIG. 3 illustrates the address maps 315 in the buffer memory 310, the address maps 315 may be external of the buffer memory 310 or external of the buffer manager 205 in other embodiments. In some embodiments, the address maps 315 are stored in a random access memory of the data storage system 100. For example, the random access memory may be a static random access memory (SRAM) or a dynamic random access memory (DRAM).

In some embodiments, the data management system 110 includes a flash storage for storing the address maps 315. In these embodiments, the data management system 110 loads the address maps 315 from the flash storage into the random access memory at the occurrence of an event, such as power-up or reset of the data management system 110. Further, the data management system 110 stores the address maps 315 into the flash storage at the occurrence of an event, such as power-down of the data management system 110, or during power failure. In this way, the address maps 315 are maintained in the flash storage during power-down or reset of the data management system 110.

FIG. 4 is a block diagram of the address map 315, in accordance with an embodiment of the present invention. The address map 315 includes logical block addresses (LBAs) 400 of the host system 105 and physical block address (PBAs) 405 of the storage device 115 corresponding to the address map 315. In this embodiment, the address map 315 maps data segments identified by an LBA 400 of the host system 105 to respective PBAs 405 the storage device 115 corresponding to the address map 315.

Figure 5:
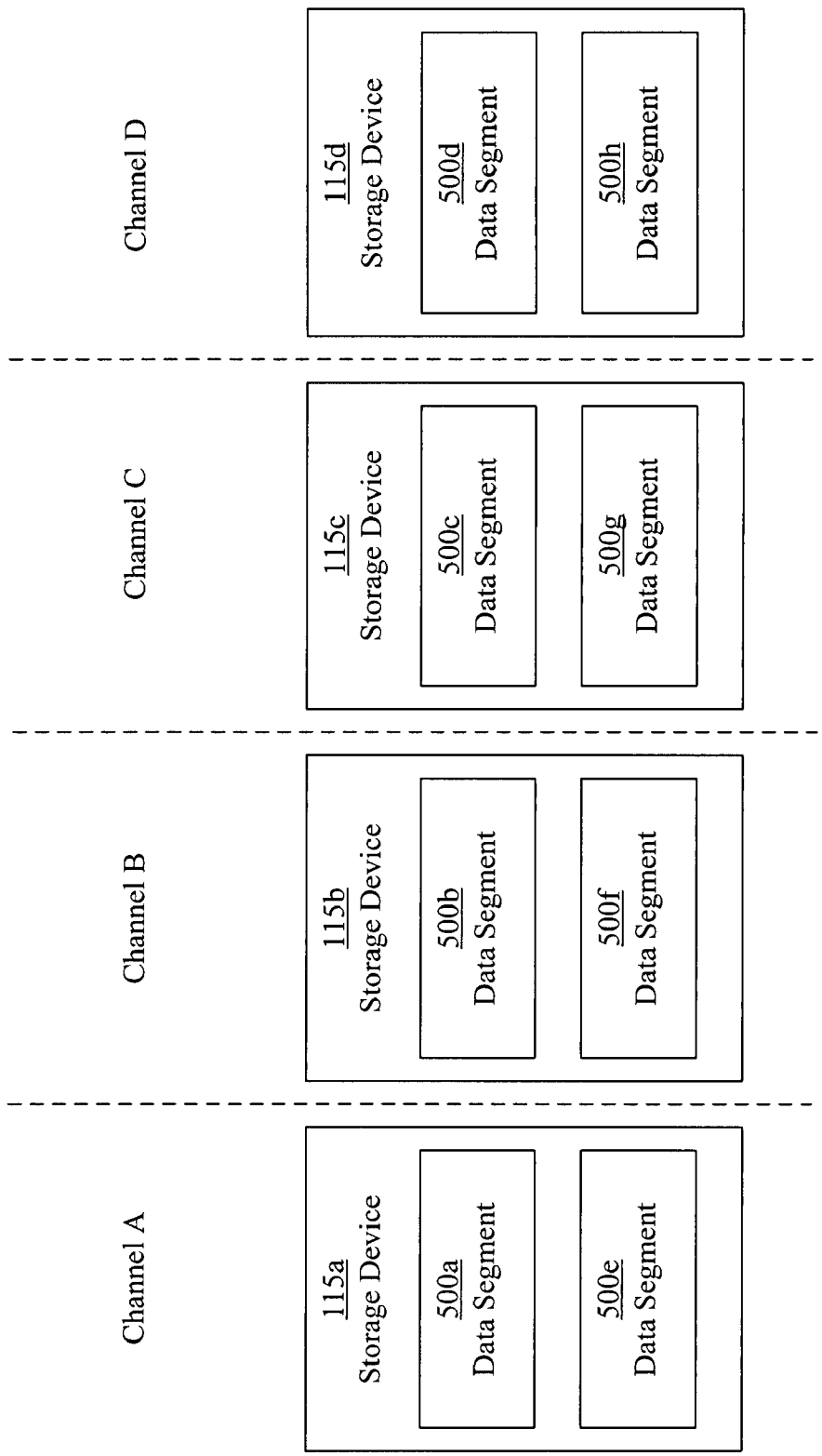
FIG. 5 is a block diagram of data segments striped across the storage devices, in accordance with an embodiment of the present invention.

FIG. 5 is a block diagram of data segments 500 striped across the storage devices 115, in accordance with an embodiment of the present invention. In this embodiment, the data management system 110 receives the data segments 500a-h sequentially from the host system 105 and maps the LBAs 400 data segments 500a-h to PBAs 405 of the storage devices 115a-d such that the data segments 500a-h are striped across the storage devices 115a-d. As illustrated in FIG. 5, the storage device 115a contains the data segments 500a and 500e, the storage device 115b contains the data segments 500b and 500f, the storage device 115c contains the data segments 500c and 500g, and the storage device 115d contains the data segments 500d and 500h.

Figure 6:
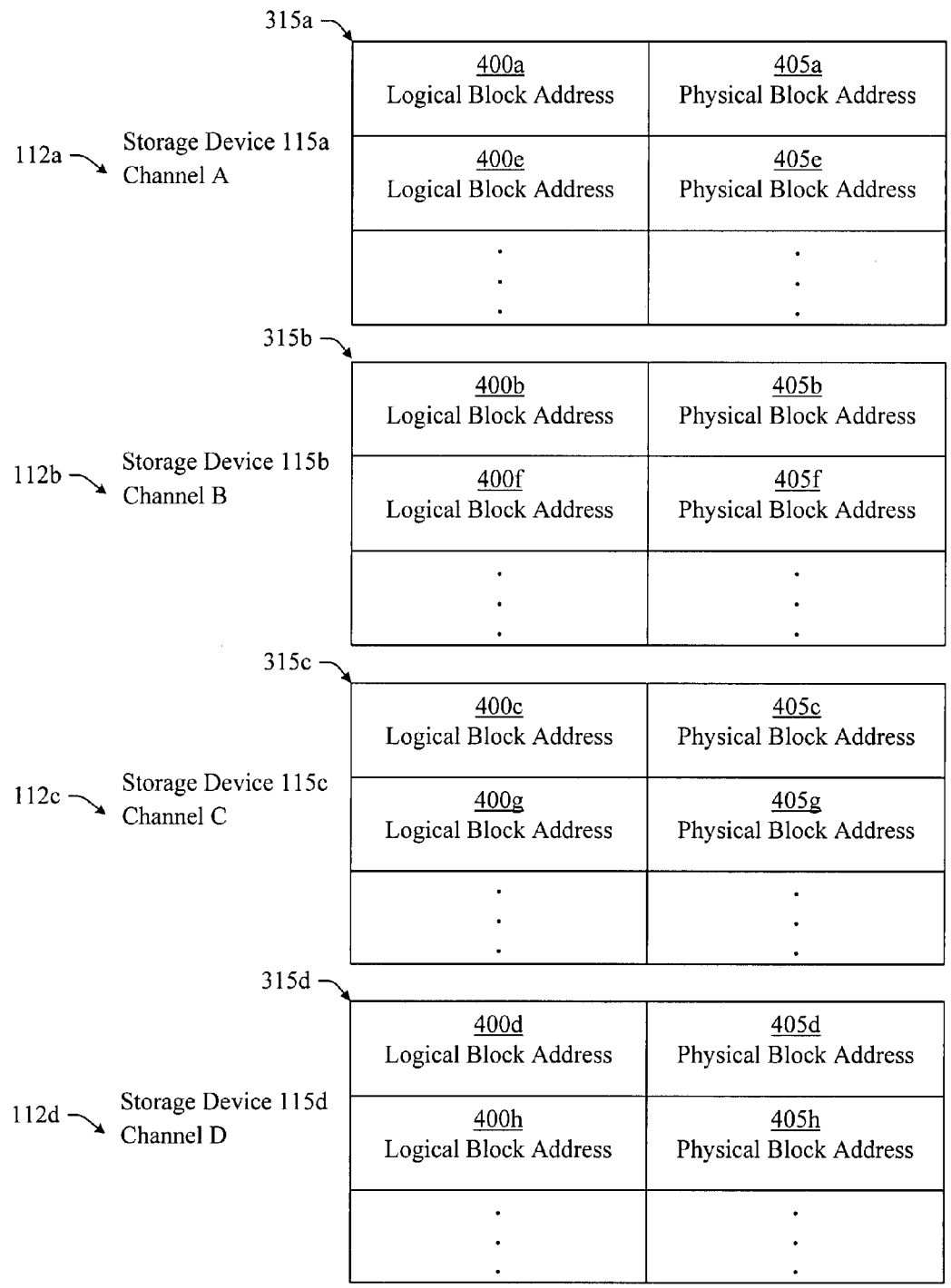
FIG. 6 is a block diagram of address maps, in accordance with an embodiment of the present invention.

FIG. 6 is a block diagram of the address maps 315, in accordance with an embodiment of the present invention. In this embodiment, the address maps 315a-d map LBAs 400a-h of the data segments 500a-h to PBAs 405a-h of the storage devices 115a-d such that the data segments 500a-h are striped across the storage devices 115a-d. The address map 315a maps the LBA 400a of the data segment 500a to the PBA 405a of the storage device 115a and the LBA 400e of the data segment 500e to the PBA 405e of the storage device 115a. The address map 315b maps the LBA 400b of the data segment 500b to the PBA 405b of the storage device 115b and the LBA 400f of the data segment 500f to the PBA 405f of the storage device 115b. The address map 315c maps the LBA 400c of the data segment 500c to the PBA 405c of the storage device 115c and the LBA 400g of the data segment 500g to the PBA 405g of the storage device 115c. The address map 315d maps the LBA 400d of the data segment 500d to the PBA 405d of the storage device 115d and the LBA 400h of the data segment 500h to the PBA 405h of the storage device 115d. The mappings are used as an illustrative example to describe the invention since in many data transfers, or many storage systems, there are substantially more mappings referencing a larger storage area than depicted in these examples.

In a further embodiment, the LBAs 400 of the address maps 315 are mapped to the storage devices 115 based on the least significant bits of the LBAs 400. For example, the least significant bits of the LBAs 400 in the address map 315a of the storage device 115a may be equal to b'00, the least significant bits of the LBAs 400 in the address map 315b of the storage device 115b may be equal to b'01, the least significant bits of the LBAs 400 in the address map 315c of the storage device 115c may be equal to b'10, and the least significant bits of the LBAs 400 in the address map 315d of the storage device 115d may be equal to b'11. In this way, consecutive LBAs 400 are striped across the storage devices 115 based on the address maps 315 containing the LBAs 400.

Figure 7:
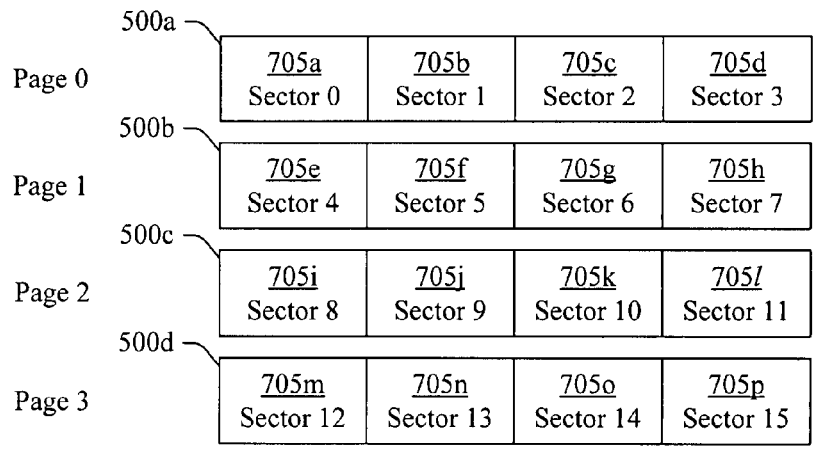
FIG. 7 is a block diagram of pages containing data sectors, in accordance with an embodiment of the present invention.

FIG. 7 illustrates data segments 500a-d containing data sectors 505, in accordance with an embodiment of the present invention. In this example, the data segment is a page of data as conventionally known in the art. As illustrated, each of the data segments 500 includes four data sectors 505. Data segment 500a includes the sequence of data sectors 505a (Sector 0), 505b (Sector 1), 505c (Sector 2), and 505d (Sector 3). Data segment 500b includes the sequence of data sectors 505e (Sector 4), 505f (Sector 5), 505g (Sector 6), and 505h (Sector 7). Data segment 500c includes the sequence of data sectors 505i (Sector 8), 505j (Sector 9), 505k (Sector 10), and 505l (Sector 11). Data segment 500d includes the sequence of data sectors 505m (Sector 12), 505n (Sector 13), 505o (Sector 14), and 505p (Sector 15). In a write operation, the data segments 500a-d are transferred from the host system 105 to the storage devices 115 according to the address map 315. In this process, the data management system 110 associates a PBA 405 with each data sector of a data segment 500a-d based on the LBA 400 of the data segment. In one embodiment, the first data sector 505 (e.g., sector 505a) in a data segment 500 (e.g., data segment 500a) is mapped to a PBA 405 of a storage device 115 and each subsequent data sector (e.g., sectors 505c-d) in the sequence of data sectors in the data segment 500 (e.g., data segment 500a) is mapped to an offset of the PBA 405. For example, the least significant bits of the PBA for the first data sector may be equal to b'00, the least significant bits of the PBA for the second data sector may be equal to b'01, the least significant bits of the PBA for the third data sector may be equal to b'10, and the least significant bits of the PBA for the fourth data sector may be equal to b'11. The data management system 110 then transfers each data sector to the storage device 115 based on the PBA 405 associated with the data sector.

Figure 8:
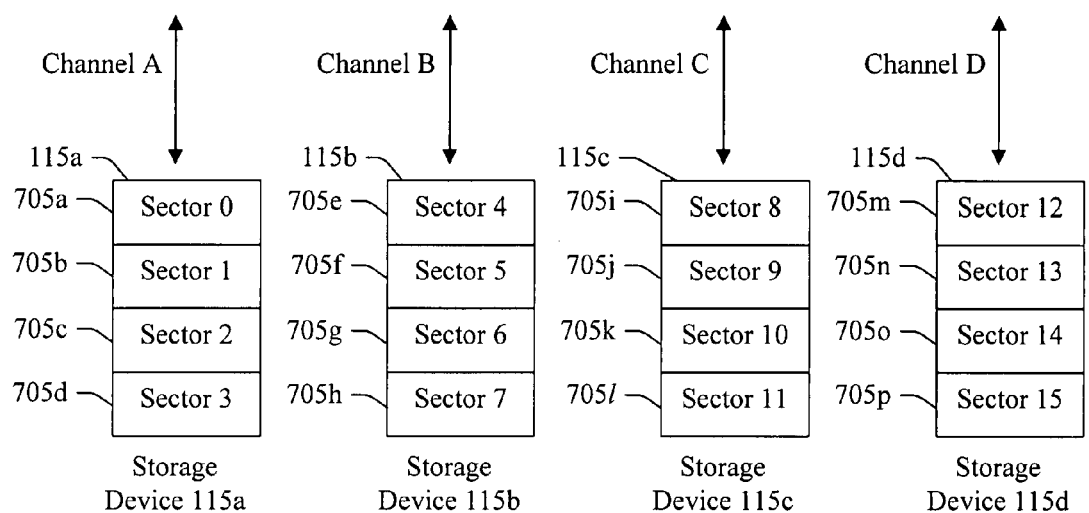
FIG. 8 is a block diagram of storage devices containing data sectors, in accordance with an embodiment of the present invention.

FIG. 8 illustrates the storage devices 115 containing data sectors, in accordance with an embodiment of the present invention. As may be envisioned from FIG. 7, each of the data segments 500, or pages, is stored in a corresponding storage device 115a-d such that the data sectors 705 of a given data segment 500 are stored in the same storage device 115 according to the address map 315 of FIG. 5. As illustrated in FIG. 8, the storage device 115a contains the data sectors 705a (Sector 0), 705b (Sector 1), 705c (Sector 2), and 705d (Sector 3). The storage device 115b contains the data sectors 705e (Sector 4), 705f (Sector 5), 705g (Sector 6), and 705h (Sector 7). The storage device 115c contains the data sectors 705i (Sector 8), 705j (Sector 9), 705k (Sector 10), and 705l (Sector 11). The storage device 115d contains the data sectors 705m (Sector 12), 705n (Sector 13), 705o (Sector 14), and 705p (Sector 15).

While FIGS. 7 and 8 illustrate a data segment comprising a page (e.g. conventionally 4 sectors), other embodiments may utilize a data segment more or less section (e.g. 1, 2, or more sectors), or a portion of a sector.

Figure 9:
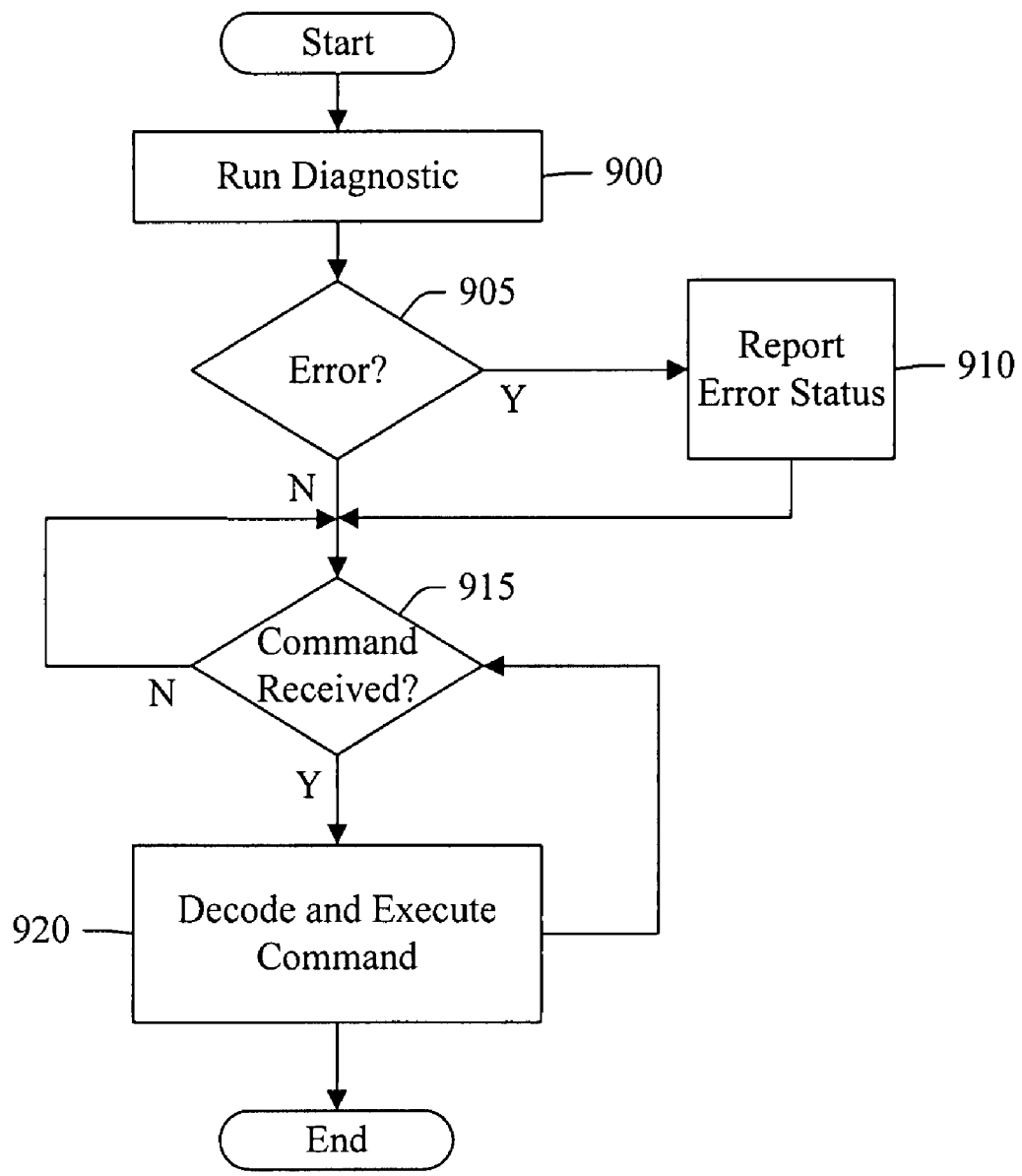
FIG. 9 is a flowchart of a method of transferring data in a data storage system, in accordance with an embodiment of the present invention.

FIG. 9 illustrates a method of transferring data in the data storage system 100, in accordance with an embodiment of the present invention. The method represents the general operating process executed by the data storage system 100. The process may be initiated at power up, following a reset of the data storage system 100, or at another time as desired.

In step 900, the controller 200 runs a diagnostic test in one or more of the storage devices 115. The diagnostic test confirms operability and determines the current status of the storage devices 115. The type of diagnostic test may depend upon the type of the storage device 115 and are well known to those skilled in the art. During execution of the diagnostic tests, the host interface 210 preferably provides a busy indicator to the host system 105 indicating that the data storage system 100 is currently unavailable. The method then proceeds to step 905.

In step 905, the controller 200 receives results of the diagnostic tests from the storage devices 115. If a result received from any of the storage devices 115 indicates an error has occurred in the storage device 115, the method proceeds to step 910. Otherwise each storage device 115 provides a ready indicator to the controller 200, and the controller 200 sends a ready indicator to the host system 105 via the host interface 210. For example, the controller 200 may send a ready indicator to the host system 105 indicating the status (e.g., ready) of the data management system 110. The method then proceeds to step 915.

In step 910, arrived at from the determination in step 905 that an error has occurred in the storage devices 115, the controller 200 determines the type of error that has occurred and stores data representing the error, for example in an error register. The controller 200 then reports the error to host system 105 via host interface 210. For example, the controller 200 may provide an error indicator to the host system 105 via the host interface 210. If the controller 200 reports the error to host system 105, the data management system 110 may perform additional operations in various embodiments. In one embodiment, the host system 105 provides a reset command to the controller 200 to attempt to clear any errors by resetting the data storage system 100. If the error persists, or if the type of error reported to host system 105 is not likely to be cleared through a reset, the host system 105 may notify a user of the error and shut down data storage operations until the data storage system 100 is fully operational. Alternatively, if one or more of the storage devices 115 provides a ready indicator to the data management system 110 after the data storage system 100 is reset, the controller 200 reports a ready indicator to the host system 105. The method then proceeds to step 915.

In step 915, arrived at from the determination in step 905 that an error has not occurred in one of the storage devices or from step 910 in which an error status has been reported to the host system 105, the data management system 110 waits to receive a command from the host system 105. If the data management system 110 receives a command from the host system 105, the host interface 210 stores the command in one or more command registers and notifies the controller 200 that a command has been received. The method then proceeds to step 920.

In step 920, the controller 200 retrieves the command from the command registers, decodes the command, and executes the command. Possible commands include, but are not limited to, a fix data transfer command (e.g., identify drive), a write command, a read command, an erasure command, or a purge command. In response to any command either not recognized or simply not supported by the data storage system 100, the controller 200 provides an abort command indicator to the host system 105 via the host interface 210.

For fix data transfer commands, the controller 200 issues requests for drive information to each of the storage devices 115 via the respective storage interfaces 220. The request format and protocol may vary depending on the type of storage device 115 and are well known to those skilled in the art. The drive information is then reported to the host system 105 via the host interface 210. Likewise, in response to a purge command, the controller 200 issues a purge command to each of the storage devices 115 via the respective storage interfaces 220. The format and protocol of the purge command may vary depending on the type of the storage device 115 and are well known to those skilled in the art. The method then returns to step 1015. In an alternative embodiment, the method ends instead of returning to step 915.

Figure 10:
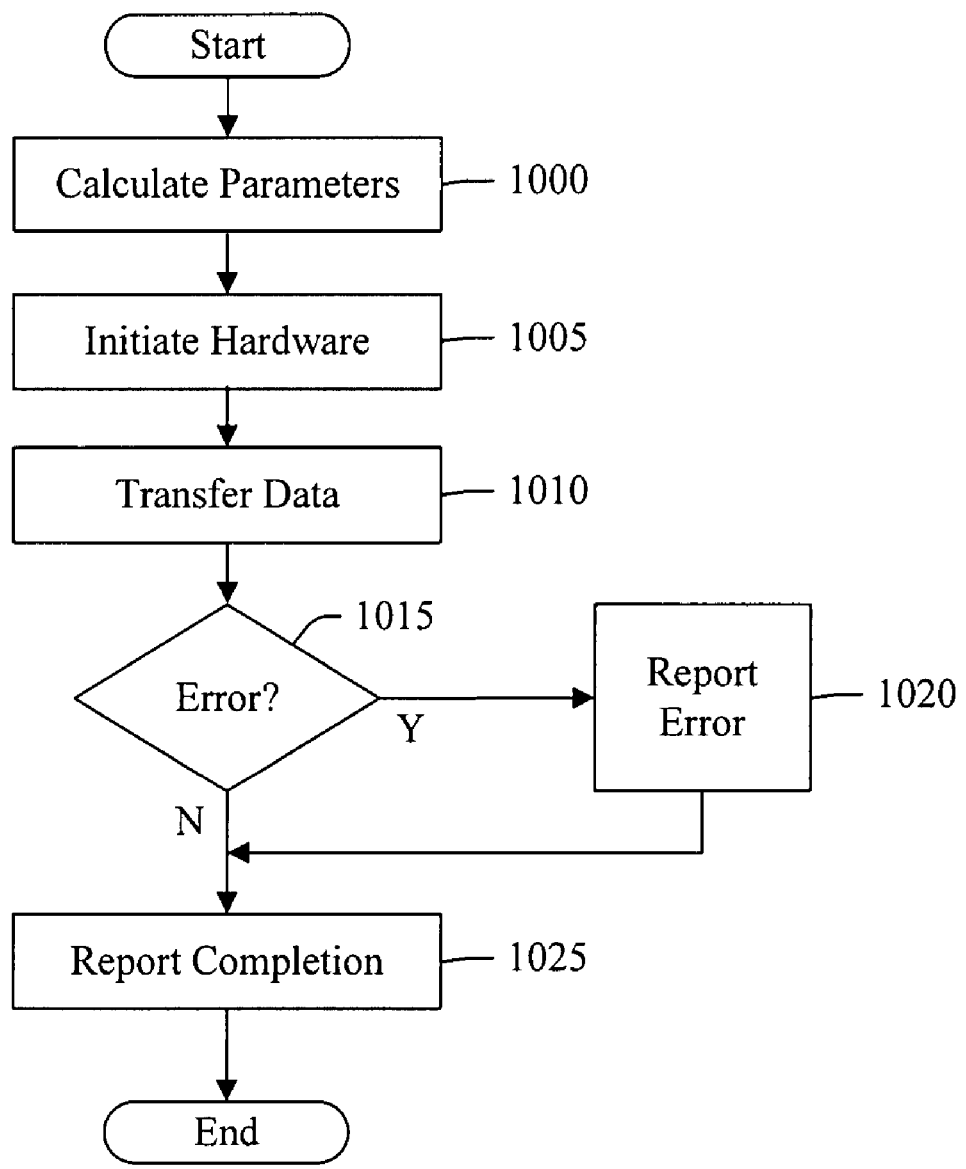
FIG. 10 is a flowchart of a portion of a method of transferring data in the data storage system, in accordance with an embodiment of the present invention.

FIG. 10 illustrates a portion of a method of transferring data between the host system 105 and the storage devices 115, in accordance with an embodiment of the present invention. This portion of the method is performed in response to the data management system 110 receiving a read command or a write command from the host system 105. In various embodiments, this portion of the method is performed in step 920 of FIG. 9. In this portion of the method, the controller 200 determines that the command received from the host system 105 is a read command or a write command, calculates the parameters of the data transfer based on the command, initiates the system hardware to be used in the data transfer, and initiates the data transfer. Upon completion of the data transfer, the controller 200 confirms the data transfer and provides an error report or a completion report to the host system 105 via the host interface 210. This portion of the method is described more fully below, in which various steps of the method are described in more detail.

In step 1000, the host interface 210 receives a command from the host system 105 and stores the command in one or more command registers. The controller 200 retrieves the command from the command registers and calculates parameters for the data transfer. The parameters of the data transfer include the logical block address (LBA) and the block count, or number of sectors, of the data to be transferred. Using these parameters, the controller 200 calculates parameters for one or more direct memory access (DMA) transfers for transferring the data between the storage devices 115 and the host system 105. For example, each of the host interface 210 and the storage interfaces 220 may include a DMA engine used to transfer data between an internal buffer of the respective host interface 210 or storage interface 220 and the buffer manager 205. The controller 200 provides each of these DMA engines with data transfer parameters which include addresses, a transfer count, and a transaction size. The method then proceeds to step 1005.

In step 1005, the controller 200 initiates the hardware to be used in the data transfer. This includes providing the respective DMA engines with the transfer parameters mentioned above. In addition, the controller 200 sends commands to the storage devices 115 via the respective storage interfaces 220 to set up the data transfer. The method then proceeds to step 1010

In step 1010, the DMA engines of the storage interfaces 220 transfer the data to the respective storage devices 115, and the storage devices 115 store the data. If a data error occurs in any of the storage devices 115, the storage device 115 in which the data error occurs provides an error indicator to the controller 200 via the respective storage interface 220. The method then proceeds to step 1015.

In step 1015, the controller 200 determines whether an error has occurred in any of the storage devices 115 based on whether the controller 200 receives an error indicator from any of the storage devices 115 or if a time-out condition occurs in the data transfer. If the controller 200 determines an error has occurred in one or more of the storage devices 115, this portion of the method proceeds to step 1120. Otherwise the controller 200 sends a ready indicator to the host system 105 via the host interface 210 and this portion of the method proceeds to step 1125. The method then proceeds to step 1020.

In step 1020, arrived at from the determination in step 1115 that an error has occurred in the storage devices 115, the controller 200 determines the type of error that has occurred and reports the error to host system 105 via the host interface 210. For example, the controller 200 may provide an error indictor or send an error message to the host system 105. Additionally, the controller 200 may store a representation of the error message, for example in an error register, for subsequent access by the host system 105. The method then proceeds to step 1025.

In step 1025, arrived at from the determination in step 1115 that an error has not occurred in any of the storage devices 115 or from step 1120 in which an error has been reported to the host system 105, the controller 200 reports the completion of the data transfer to the host system 105. This portion of the method then ends. In an alternative embodiment, this portion of the method instead returns to step 915 of FIG. 9.

Figure 11:
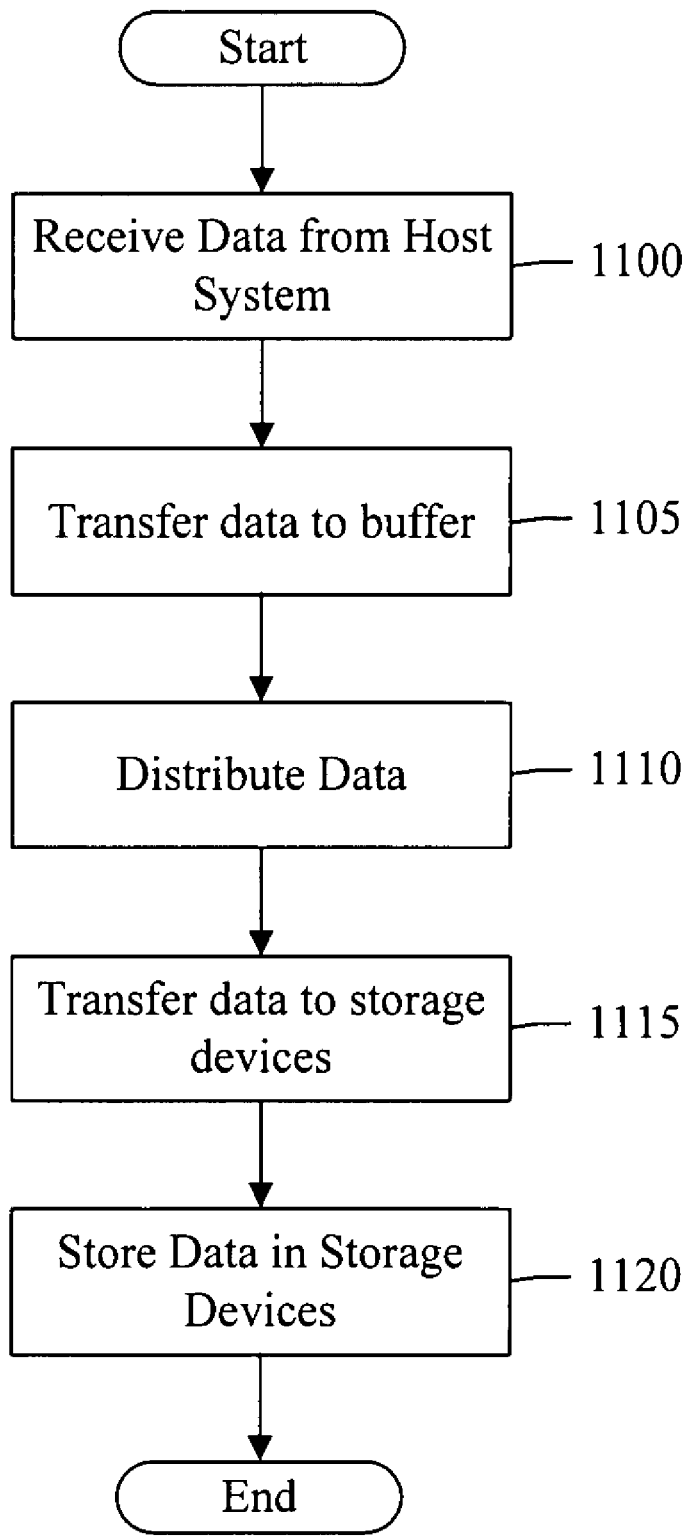
FIG. 11 is a flowchart of a portion of a method of transferring data in the data storage system in which data is written to data storage devices, in accordance with an embodiment of the present invention.

FIG. 11 illustrates a portion of a method of writing data to the storage devices 115*a-d*, in accordance with an embodiment of the present invention. For example, this portion of the method of transferring data from the host system 105 to the storage devices 115 may be performed in response to the data management system 110 receiving a write command from the host system 105. In various embodiments, this portion of the method is performed during step 1010 of FIG. 10. The data management system 110 receives data from the host system 105 and stores the data. The data management system 110 then distributes the data among the storage devices 115 and the storage devices 115 store the data. This portion of the method is described more fully below, in which various steps of the method are described in more detail.

In step 1100, the host interface 210 receives data from the host system 105. The data of a data unit may be any portion of the data unit. As data is received, the host interface 210 facilitates the storage of the data segments in a buffer, which may be internal or external of the host interface 210. The host interface 210 may also receives a write command from the host system 105 along with the data segments. The method then proceeds to step 1105.

In step 1105, the DMA engine of the host interface 210 transfers the data to the buffer memory 310 of the buffer manager 205 based on the write command. If the buffer memory 310 is implemented using a dual port memory, the host interface 210 may be connected directly to one of the ports of the buffer memory 310 so that the DMA engine of the host interface 210 writes the data into the buffer memory 310 without going through switch 215. Additionally, the controller 200 may be configured to directly access to the buffer manager 205 without having to go through the switch 215. If the buffer memory 310 is implemented as a single port memory, the DMA engine of the host interface 210 transfers the data segments to buffer memory 310 via switch 215.

In the arrangement shown in FIG. 2, in which the host interface 210 is coupled to the buffer manager 205 via the switch 215, access to the buffer manager 205 is granted using an arbitration scheme. Specifically, the switch 215 is controlled by the controller 200 to selectively couple the host interface 210 and the storage interfaces 220 to buffer manager 205 by alternating access to the buffer manager 205 from the host interface 210 and one of storage interfaces 220 based on an arbitration scheme. Possible arbitration schemes include, but are not limited to, a round-robin scheme, a fixed priority scheme, a dynamic priority scheme, and the like. For example, a fixed priority scheme may provide access from the host interface 210 to the buffer manager 205 and then successively provide access from each of the storage interfaces 220 to the buffer manger 205 in a predetermined order before again providing access from the host interface 210 to the buffer manager 205.

As another example, a dynamic priority scheme may provide access from the host interface 210 and the storage interfaces 220 to the buffer manager 205 based on measured performance characteristics of the data management system 110. In the way, performance of the data management system 110 may be optimized based on the performance characteristics. The arbitration of access by the individual storage interfaces 220 is described in more detail below. During each time slot of the arbitration scheme, the DMA engine of the host interface 210 transfers a portion of the data to the buffer manager 205. By alternating access to the buffer manager 205, the subsequent transfer of data to the storage devices 115 may begin prior to receiving all of the data from the host system 105. The method then proceeds to step 1110.

In step 1110, the data stored in the buffer manager 205 is distributed among the storage devices 115. In this process, data segments are individually transferred from the buffer manager 205 to one of the storage interfaces 220. In this way, the data segments are distributed among the storage devices 115*a-d* coupled to the respective storage interfaces 220. In one embodiment, each of the storage interfaces 220 includes a DMA engine that transfers the data segments from the buffer manager 205 to the corresponding storage interface 220 in a DMA transfer.

In various embodiments, the data segments are transferred to the storage interfaces 220 using an arbitration scheme. In this process, a data segment is selected based on an arbitration scheme and are transferred to one storage interface 220 by the DMA engine of that storage interface 220 during sequential time slots. The next data segment is then selected and transferred to another storage interface 220 by the DMA engine of that storage interface 220 during sequential time slots. The arbitration scheme may include a round-robin scheme, a fixed priority scheme, a dynamic priority scheme, or any other arbitration scheme. Using the round-robin scheme for example, each of the storage interfaces 220 receives the data segments during each round of the arbitration scheme. For example, the storage interface 220*a* receives a first data segment, the storage interface 220*b* receives a second data segment, the storage interface 220*c* receives a third data segment, and the storage interface 220*d* receives a fourth data segment. The process is then repeated until all of the data segments are transferred from the host system 105 to the storage interfaces 220.

In one embodiment, the data segments are routed to particular storage interfaces 220 using a static routing algorithm controlled by the controller 200. In this process, a given data segment is sent to the same storage interface 220 for storage in a respective storage device 115. For example, all of the data of a first data segment are sent to the storage interface 220*a*, all of the data of a second data segment are sent to the storage interface 220*b*, all of the data of a third data segment are sent to the storage interface 220*c*, and all of the data for a forth data segment are sent to the storage interface 220d. This process is repeated to distribute the data segments among the storage interfaces 220a-d.

Access to the buffer manager 205 may be allocated between the host interface 210 and the storage interfaces 220 by using an arbitration scheme. In this way, the switch 215 is controlled to alternate access to the buffer manager 205 between the host interface 210 and the storage interfaces 220. For example, using a round-robin scheme, the switch 215 is controlled to allow the host interface 210 to facilitate the transfer of one data segment to the buffer manager 205, followed by the storage interface 220a transferring one data segment out of the buffer manager 205, followed by the host interface 210 transferring another data segment to the buffer manager 205, and then the storage interface 220b transferring a data segment out of buffer manager 205. This allocation process is repeated to allow each of the storage interfaces 220 access to the buffer manager 205 with alternating access being granted to the host interface 210.

In various embodiments, the data segments are distributed among the storage interfaces 220 based on the write command. This distribution process may promptly begin as soon as data is available in the buffer manager 205. Alternatively, the distribution process may wait until a minimum number of data segments have been transferred and stored in the buffer manager 205 before starting the distribution process. In one embodiment, the distribution process begins once the number of data segments stored in the buffer manager 205 is sufficient to allow the transfer of data to begin for one of the storage interfaces 220. Splitting access to the buffer manager 205 between the host interface 210 and the storage interfaces 220 allows the distribution of data segments to occur while the transfer of data into the buffer manager 205 continues until all the data segments have been received from the host system 105.

During the data distribution process, the controller 200 monitors each of the buffers internal to the storage interfaces 220 to prevent overflow from occurring. In the event that one of the storage interfaces 220 has no capacity for receiving additional data, the controller 200 stops the transfer of data to that storage interface 220 until the buffer has recovered. During this time, data transfers from the host interface 210 into the buffer manager 205 may continue. In addition, the controller 200 uses a buffer register to monitor and control the flow of data into the buffer manager 205. The buffer register includes one or more registers and a finite state machine. The buffer register is updated by the controller 200 to reflect the status of the buffer manager 205. The status information in the buffer register may include a full/empty indicator, a capacity used indicator, a capacity remaining indicator, among others. The buffer register may be part of the controller 200 or the buffer manager 205, or the buffer register may be implemented as a separate component accessible by the controller 200. The method then proceeds to step 1115.

In step 1115, the data segments received by the storage interfaces 220 are transferred to the respective storage devices 115. In this process, the storage interfaces 220 may store the data segments before the data segments are transferred to the respective storage devices 115. This data transfer process occurs in parallel thereby providing improvements to overall storage performance of the data storage system 100. These advantages become significant when the data transfer rates of the individual storage interfaces 220 and the storage devices 115 are slower than the data transfer rate between the host system 105 and the host interface 210. For example, solid-state storage devices using flash memory typically have a data transfer rate slower than that of conventional hard drives. In various embodiments, an array of solid-state storage devices may be used as the storage devices 115 to provide a cumulative data transfer rate comparable to that of a typical hard disk drive. The method then proceeds to step 1120.

In step 1120, the storage devices 115 store the data received from the respective storage interfaces 220. Improvements in the overall data transfer rate of the data storage system 100 are achieved when the individual components of the data storage system 100 have adequate data transfer rates. For example, in the above-described embodiment in which the switch 215 allocates access to the buffer manager 205 between the host interface 210 and the storage interfaces 220, the switch 215 should have a data transfer rate at least twice as fast as the fastest data transfer rate of each of the storage interfaces 220. This allows the data transfer through the data storage system 100 to be maintained without the back end data transfer to the storage devices 115 having to wait for data transfers on the front end from the host system 105.

In one embodiment, the host interface 210 receives a write command in step 1100 along with an updated data segment for updating a selected data segment in one of the storage devices 115. In this embodiment, the host interface 210 transfers the updated data segment to the buffer memory 310 of the buffer manager 205 in step 1105 based on the write command. In step 1110, the controller 200 identifies the storage device 115 containing the selected data segment and transfers the updated data segment to the storage interface 220 coupled to the storage device 115. In turn, the storage interface 220 transfers the updated data segment into the storage device 115 containing the previous data segment for replacement of the previous data segment with the updated data segment. In this process, the controller 200 may provide an erasure command to the storage device 115 for erasing the previous data segment from the storage device 115 followed by a write command for writing the updated data segment into the storage device 115. Because the data of the updated data segment are stored in the same storage device 115, the erasure operation occurs only in that storage device 115. In this way, the overall number of erasure operations performed on the storage devices 115 of the data storage system 100 is reduced. Because the lifetime of each storage device 115 is inversely related to the number of erasure operations performed on that storage device 115, reducing the number of erasure operations performed on each storage device 115 increases the lifetimes of the storage devices 115 and the data storage system 100.

Once the data transfer is completed, this portion of the method ends. In one embodiment, the method then proceeds to step 1015 of FIG. 10, in which it is determined if an error occurred during the data transfer. If an error occurred in any of the storage devices 115 during the data transfer, the controller 200 reports the error to host system 105 in step 1020. If no error occurred in any of the storage devices 115 during the data transfer, the controller 200 reports the completion of the data write command in step 1025.

An optimal number of data sectors in each data segment, and hence a preferred size of the individual data sectors, is influenced by several factors. For example, the internal data bus bandwidth of the switch 215 sets one performance limit. The internal data bus bandwidth (P) is the sum of the effective bandwidth (E), the overhead bandwidth (O), and the idle bandwidth (I) of the switch 215. As data segment size is reduced, system overhead increases due to the increase in switching and in the number of data transfer transactions that are completed. As overhead increases, the effective bandwidth of the switch 215 decreases thereby reducing performance of the data storage system 100.

Another factor that influences the data segment size is the capacity of internal buffers of the host interface 210 and the storage interfaces 220, which are typically implemented as first-in-first-out (FIFO) buffers. As the data segment size increases, the internal buffers store more data prior to transferring the data. Larger buffers require larger logic circuits in the host interface 210 and storage interfaces 220, which may not be acceptable in view of other design constraints.

Yet another factor is the back-end bandwidth available from the storage devices 115. The back-end bandwidth is derived from a combination of the number of storage devices 115 used in the system and the individual bandwidths of the storage devices 115. Once the effective bandwidth (E) of the switch 215 reaches the back end bandwidth of the storage devices 115, increasing the data segment size may not result in additional significant performance improvements of the data storage system 100.

Figure 12:
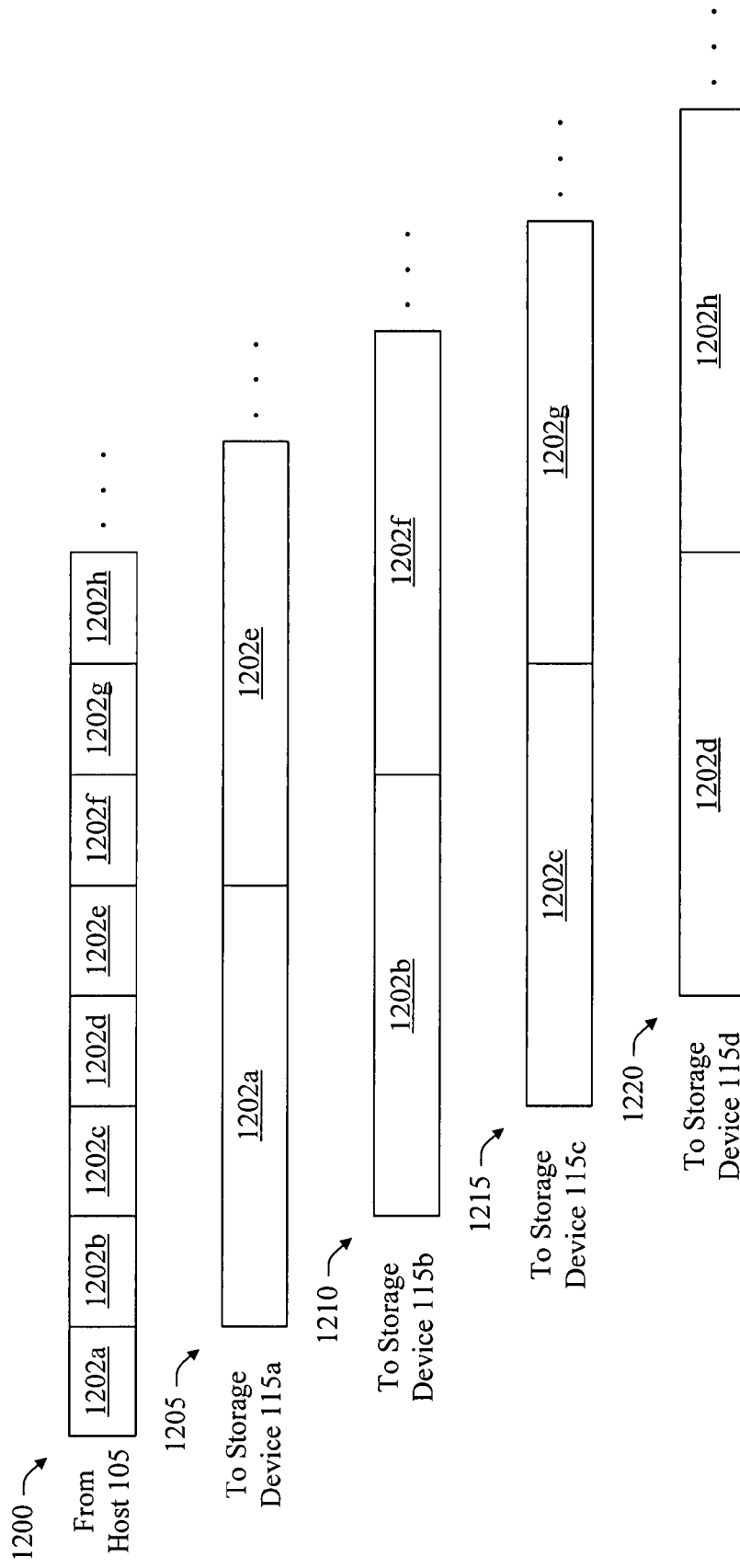
FIG. 12 is a diagram representing a data transfer from a host system to storage devices in which data is written into the storage devices, in accordance with an embodiment of the present invention.

FIG. 12 illustrates a data transfer from the host system 105 to the storage devices 115a-d, in which data is written into the storage devices 115a-d, in accordance with an embodiment of the present invention. For example, the data transfer from the host system 105 to the storage devices 115a-d may be a write operation. In the data transfer, the data management system 110 receives a sequence 1200 of eight data segments 500 (e.g., data segments 500a-h) from the host system 105. The eight data segments are used as for exemplary illustrative purposes to describe the invention; however, in many data transfers would involve substantially more data segments. The data management system 110 transfers a sequence of two data segments 1205 to the storage device 115a, a sequence of two data segments 1210 to the storage device 115b, a sequence of two data segment 1215 to the storage device 115c, and a sequence of two data segments 1220 to the storage device 115d. As illustrated in FIG. 12, each of the sequences of data segments 1205, 1210, 1215, and 1220 are transferred to the storage devices 115a-d subsequent to the time slot in which the data segment 1202 is received by the data management system 110 from the host system 105 in the sequence of data segments 1200.

Because the data transfer rate from the host system 105 to the data management system 110 is generally faster than the data transfer rate from the data management system 110 to each of the individual storage devices 115, the transfer of each sequence of data segments 1205, 1210, 1215, and 1220 overlaps the transfer of at least one other sequence of data segments 1205, 1210, 1215, or 1220 in time. Stated differently, the sequence of data segments 1205, 1210, 1215, and 1220 are transferred from the data management system 110 to the storage devices 115 substantially in parallel. This is possible because each of the storage interfaces 220 independently transfers a respective sequence of data segments 1205, 1210, 1215, and 1220 to the respective storage devices 115 through the corresponding data channels 112a-d after that storage interface 220 receives the first data segments 1202 of the sequence 1205, 1210, 1215, or 1220 from the host interface 210.

Figure 13:
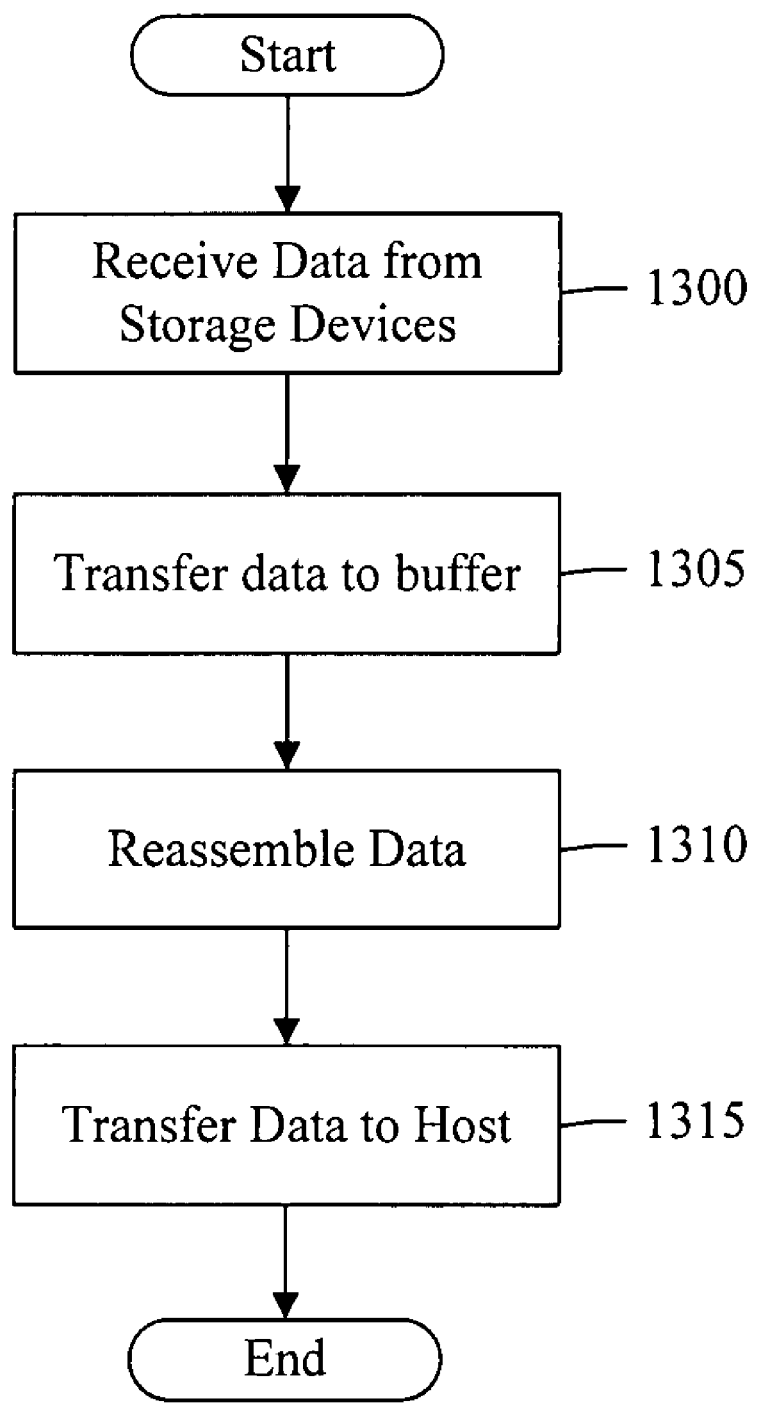
FIG. 13 is a flowchart for a portion of a method of transferring data in the data storage system in which data is read from storage devices, in accordance with an embodiment of the present invention.

FIG. 13 illustrates a portion of a method of transferring data from the storage devices 115 to the host system 105, in accordance with an embodiment of the present invention. For example, this portion of the method of transferring data from the storage devices 115 to the host system 105 may be performed in response to the data management system 110 receiving a read command from the host system 105. In various embodiments, this portion of the method is performed during step 920 of FIG. 9. The data management system 110 requests data segments (e.g., data segments 500a-h) from the storage devices 115. The data segments are then transferred from the storage devices 115 to the respective storage interfaces 220. The data segments are then transferred from the storage interfaces 220 to the buffer manager 205 using an arbitration scheme, such as a round-robin arbitration scheme. In this process, a data segment is selected based on the arbitration scheme and the data segments are transferred from the storage interface 220 containing the selected data segment to the buffer manager 205 during sequential time slots. The next data segment is then selected and transferred from the storage interface 220 containing this data segment to the buffer manager 205 during sequential time slots. The buffer manager 205 transfers the data segment to the host system 105 via the host interface 210. This portion of the method is described more fully below, in which various steps of the method are described in more detail.

In step 1300, the data segments requested by host system 105 are received by the storage interfaces 220 from the respective storage devices 115. In one embodiment, the controller 200 receives a read command from the host system 105 via the host interface 210 and provides a read command to each of the storage devices 115 via the respective storage interfaces 220. Each of the storage interfaces 220 then individually transfers one or more data segments to the respective storage interface 220 based on the read command received from the respective storage interface 220. The method then proceeds to step 1305.

In step 1305, the storage interfaces 220 transfer the data segments to the buffer manager 205 one data segment at a time as the data segments are received from the respective storage devices 115. In one embodiment, DMA engines of the storage interfaces 220 transfer the data segments to the buffer manager 205 based on transfer parameters provided by the controller 200. Similar to the process described above with respect to FIG. 11, access to the buffer manager 205 is controlled via the switch 215 using an arbitration scheme performed by the controller 200. In this way, the storage interfaces 220 are given alternating access to the buffer manager 205 for transferring data cells according to the arbitration scheme. The method then proceeds to step 1310.

In step 1310, the data segments are reassembled in the buffer manager 205 into data for transfer to the host system 105. In one embodiment, the buffer manager 205 reassembles data segments by storing data of the data segments together as they are transferred into buffer manager 205. The method then proceeds to step 1315.

In step 1315, the DMA engine of the host interface 210 transfers the data segments to the host system 105 using transfer parameters provided by the controller 200. The controller 200 allocates access to the buffer manager 205 by the host interface 210 and the storage interfaces 220 by using an arbitration scheme, such as those described above. As with the data storage process of FIG. 11, the host interface 210 may begin transferring data to the host system 105 immediately upon buffer manager 205 receiving the first data segment from one of the storage interfaces 220. Alternatively, the host interface 210 may wait until a minimum amount of data has been transferred to the buffer manager 205 from the storage devices 115. In one embodiment, the controller 200 alternates access to the buffer manager 205 between the host interface 210 and the storage interfaces 220 based on an arbitration scheme. This portion of the method then ends. In one embodiment, the method then proceeds to step 1110 of FIG. 10.

Figure 14:
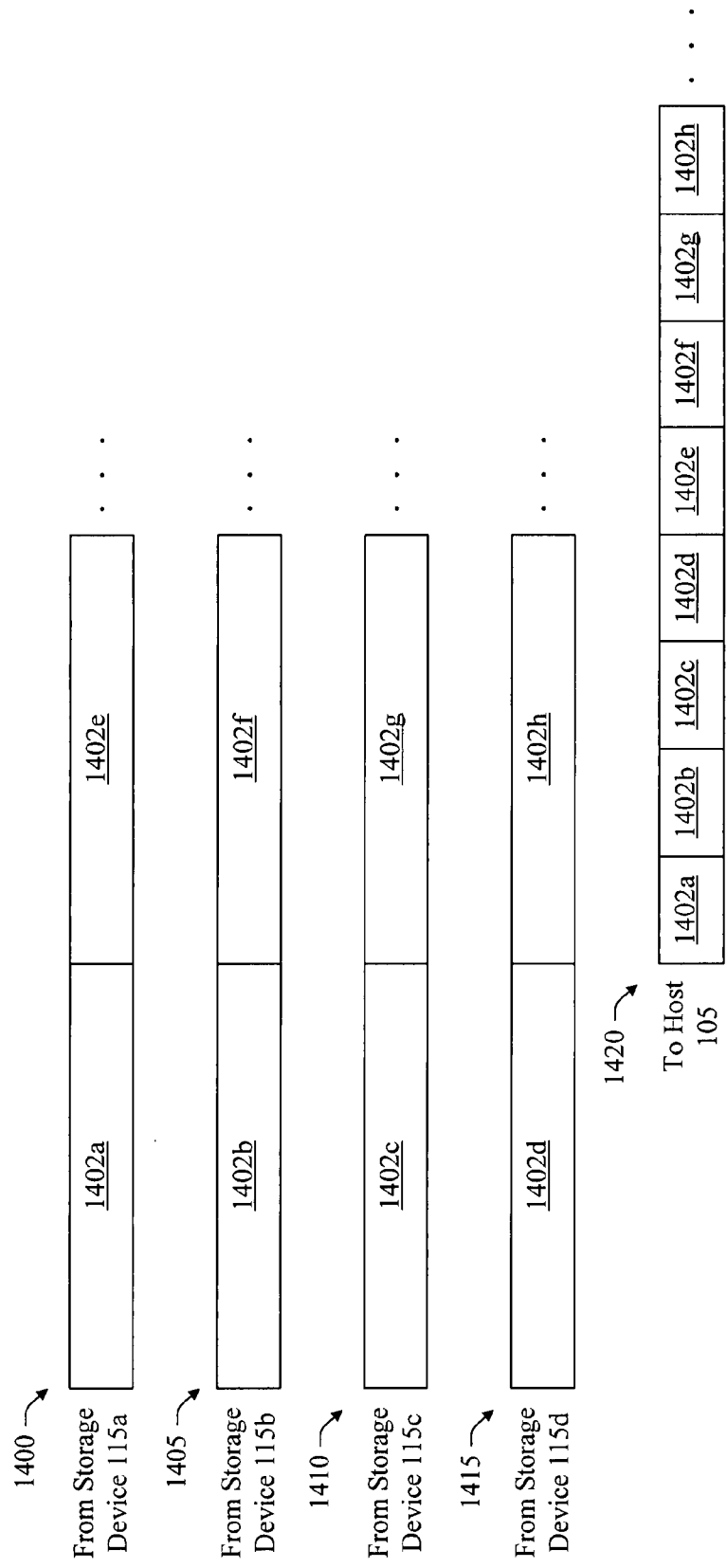
FIG. 14 is a diagram representing a data transfer in a data storage system in which data is transferred from storage devices to a host system, in accordance with an embodiment of the present invention.

FIG. 14 illustrates a data transfer from the storage devices 115 to the host system 105, in which data is read from the storage devices 115, in accordance with an embodiment of the present invention. For example, the data transfer from the host system 105 to the storage devices 115-a-d may be a read operation. In the data transfer, the data management system 110 receives eight data segments 1402 (e.g., data segments 1402a-h) from the respective storage devices 115 substantially in parallel. The eight data segments are used as for exemplary illustrative purposes to describe the invention; however, in many data transfers would involve substantially more data segments. The data management system 110 receives a sequence 1400 of two data segments 1402a and 1402e from the storage device 115a, a sequence 1405 of two data segments 1402b and 1402f from the storage device 115b, a sequence 1410 of two data segments 1402c and 1402g from the storage device 115c, and a sequence 1415 of two data segments 1402d and 1402h from the storage device 115d. The data management system 110 begins to transfer the data segments 1402 received from the storage devices 115 to the host system 105 once the first data segment 1402 is received from the storage devices 115. As illustrated in FIG. 14, the data management system 110 transfers a sequence 1420 of the data segments 1402 received from the storage devices 115 to the host system 105. For example, the data management system 110 may transfer the sequence of data segments 1420 to the host system 105 during sequential time slots by transferring one data segment at a time during each time slot.

The foregoing description of the present invention illustrates and describes the preferred embodiments of the present invention. However, it is to be understood that the present invention is capable of use in various other combinations and modifications within the scope of the inventive concepts as expressed herein, commensurate with the above teachings, and/or the skill or knowledge of the relevant art. The embodiments described hereinabove are further intended to explain the best modes known of practicing the present invention and to enable others skilled in the art to utilize the present invention in such, or other, embodiments and with the various modifications required by the particular applications or uses of the present invention. Accordingly, the description is not intended to limit the scope of the present invention, which should be interpreted using the appended claims.

What is claimed is:

1. A method for distributed addressing in a solid-state storage system, the method comprising:
   receiving a plurality of data segments, each data segment of the plurality of data segments comprising a plurality of data sectors;
   storing the plurality of data segments in a buffer; and
   distributing the data segments among a plurality of solid-state storage devices, wherein the plurality of data sectors of each data segment of the plurality of data segments is sequentially transferred to a respective one of the plurality of solid-state storage devices, and wherein the data segments of the plurality of data segments are transferred to the plurality of solid-state storage devices in parallel through data channels corresponding to the solid-state storage devices.

2. The method of claim 1, further comprising maintaining a plurality of address maps, wherein each address map is associated with a data channel, and wherein each address map reflects the storage locations of the data segments transferred through the data channel.

3. The method of claim 2, further comprising transferring the data sectors of each data segment of the plurality of data segments from the buffer to a storage interface associated with the data segment, wherein the data sectors of each data segment of the plurality of data segments are sequentially transferred to the storage interface associated with the data segment, and wherein distributing the data segments among the plurality of storage devices comprises transferring the plurality of data segments from the plurality of storage interfaces to the plurality of storage devices through the data channels corresponding to the storage devices substantially in parallel.

4. The method of claim 3, wherein the data sectors of a first data segment of the plurality of data segments are sequentially transferred to the storage interface associated with the first data segment before the data sectors of a second data segment of the plurality of data sectors are sequentially transferred to the storage interface associated with the second data segment.

5. The method of claim 3, wherein the plurality of data segments are transferred to the plurality of solid-state storage devices in parallel by sequentially transferring the data sectors of each data segment of the plurality of data segments from the storage interface associated with the data segment to the solid-state storage device associated with the data segment.

6. The method of claim 5, wherein the data sectors of the plurality of data segments are received from a host system at a first data transfer rate and are transferred to the plurality of solid-state storage devices at a second data transfer rate differing from the first data transfer rate.

7. The method of claim 1, further comprising:
   selecting a data sector stored in a storage device of the plurality of solid-state storage devices;
   identifying the solid-state storage device containing the selected data sector;
   receiving an updated data sector; and
   updating the selected data sector with the updated data sector in the identified storage device.

8. The method of claim 7, wherein updating the selected data sector with the updated data sector comprises writing the updated data sector to the identified storage device.

9. The method of claim 8, wherein updating the selected data sector further comprises erasing the selected data sector from the identified solid-state storage device.

10. The method of claim 1, wherein the data sectors of the plurality of data segments are received from a host system at a first data transfer rate and are transferred to the plurality of solid-state storage devices at a second data transfer rate differing from the first data transfer rate.

11. The method of claim 1, wherein the data segments of the plurality of data segments are distributed among the plurality of solid-state storage devices by using a fixed priority scheme.

12. The method of claim 1, wherein the data segments of the plurality of data segments are distributed among the plurality of solid-state storage devices by using a dynamic priority scheme.

13. The method of claim 1, wherein the data segments of the plurality of data sectors are distributed among the plurality of solid-state storage devices by using a fixed priority scheme.

14. A data storage system utilizing distributed addressing comprising:
   a plurality of solid-state storage devices;
   a plurality of communication channels corresponding to the plurality of solid-state storage devices, each communication channel of the plurality of communication channels coupled to the solid-state storage device corresponding to the communication channel; and
   a data management system coupled to the plurality of solid-state storage devices through the plurality of communication channels, the data management system configured to receive a plurality of data segments, each data segment of the plurality of data segments comprising a plurality of data sectors, the data management system further configured to distribute the data segments of the plurality of data segments among the plurality of solid-state storage devices, wherein the plurality of data sectors of each data segment of the plurality of data segments is sequentially transferred to a solid-state storage device associated with the data segment, and wherein the data segments of the plurality of data segments are transferred to the plurality of solid-state storage devices in parallel through the plurality of communication channels.

15. The data storage system of claim 14, wherein the data management system comprises a host interface configured to receive the plurality of data segments from a host system.

16. The data storage system of claim 15, wherein the data management system further comprises a buffer coupled to the host interface and configured to store the plurality of data segments.

17. The data storage system of claim 16, wherein the data management system further comprises a plurality of storage interfaces coupled to the buffer and the plurality of solid-state storage devices, each storage interface of the plurality of storage interfaces associated with a data segment of the plurality of data segments and configured to receive the data of the data segment and to transfer the data segment to the solid-state storage device associated with the data segment.

18. The data storage system of claim 17, further comprising a controller coupled to the buffer and the plurality of storage interfaces, the controller configured to transfer the data sectors of each data segment of the plurality of data segments from the buffer to the plurality of storage interfaces, wherein the data sectors of each data segment are sequentially transferred to the storage interface associated with the data segment through the data channel corresponding to the solid-state storage device.

19. The data storage system of claim 18, wherein the buffer is further configured to receive the data sectors of the plurality of data segments from the host interface sequentially and store the data sectors of the plurality of data segments sequentially.

20. The data storage system of claim 19, wherein the buffer sequentially transfers the data sectors of a first data segment of the plurality of data segments to the storage interface associated with the first data segment before transferring the data sectors of a second data segment of the plurality of data segments to the storage interface associated with the second data segment.

* * * * *